United States Patent [19]

Yoshida

[11] 4,002,043

[45] Jan. 11, 1977

[54] APPARATUS FOR ABSORBING TORQUE FLUCTUATIONS PRODUCED BY AN INTERNAL COMBUSTION ENGINE

[75] Inventor: Akio Yoshida, Toyota, Japan

[73] Assignee: Toyota Jidosha Kogyo Kabushiki Kaisha, Japan

[22] Filed: May 7, 1975

[21] Appl. No.: 575,233

Related U.S. Application Data

[63] Continuation-in-part of Ser. No. 416,370, Nov. 16, 1973, abandoned.

[30] Foreign Application Priority Data

July 10, 1973  Japan .............................. 48-77035

[52] U.S. Cl. .............................. 64/27 C; 64/1 V; 64/15 C; 74/572
[51] Int. Cl.² .............................. F16D 3/14
[58] Field of Search ............... 64/1 V, 15 R, 15 C, 64/27 R, 27 C, 27 CS, 27 F, 23.7, 9 A; 74/574, 572

[56] References Cited

UNITED STATES PATENTS

| | | | |
|---|---|---|---|
| 986,498 | 3/1911 | Raders | 64/27 C |
| 1,956,798 | 5/1934 | Janssen | 64/27 C |

FOREIGN PATENTS OR APPLICATIONS

| | | | |
|---|---|---|---|
| 1,274,314 | 1/1960 | France | 64/27 C |
| 300,535 | 9/1932 | Italy | 64/15 C |
| 639,542 | 6/1950 | United Kingdom | 64/15 R |

*Primary Examiner*—Samuel Scott
*Assistant Examiner*—Randall Heald
*Attorney, Agent, or Firm*—Kenyon & Kenyon

[57] ABSTRACT

A damped vibration system includes a plurality of rotationally inert bodies arranged on a common axis of rotation facing each other with a small gap therebetween. Spring elements are provided between the facing bodies that are displaceable circumferentially with respect to the axis of rotation. Damping elements, preferably in the form of steel balls disposed in radial or circular grooves having sufficient clearance to permit relative angular movement between the facing inert bodies, are provided between the facing bodies. The apparatus is directly connectable to the crank-shaft of the internal combustion engine and also engageable with the drive train of a vehicle. The damped vibration system has a resonant angular frequency preselected to be a certain value below the angular frequency of ignition of the internal combustion engine.

14 Claims, 11 Drawing Figures

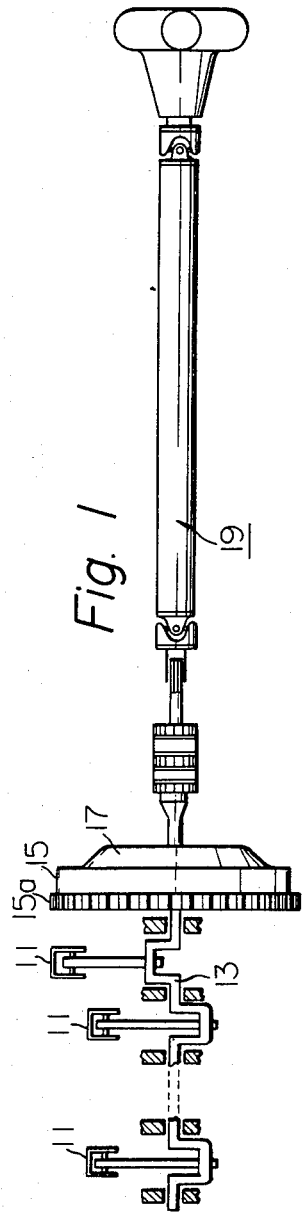
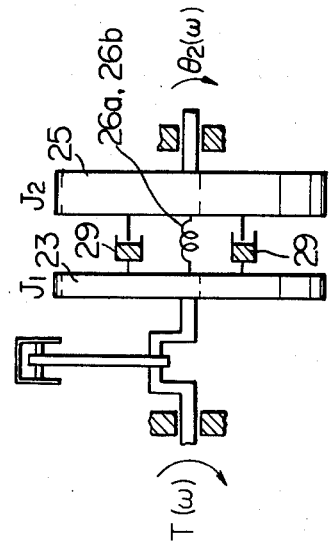
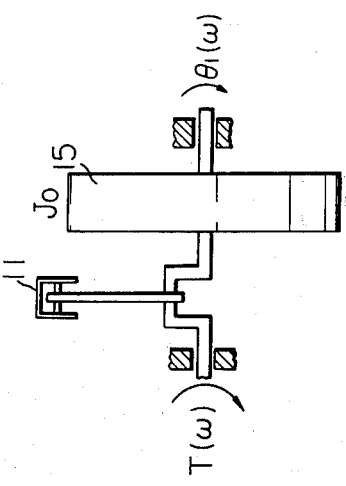

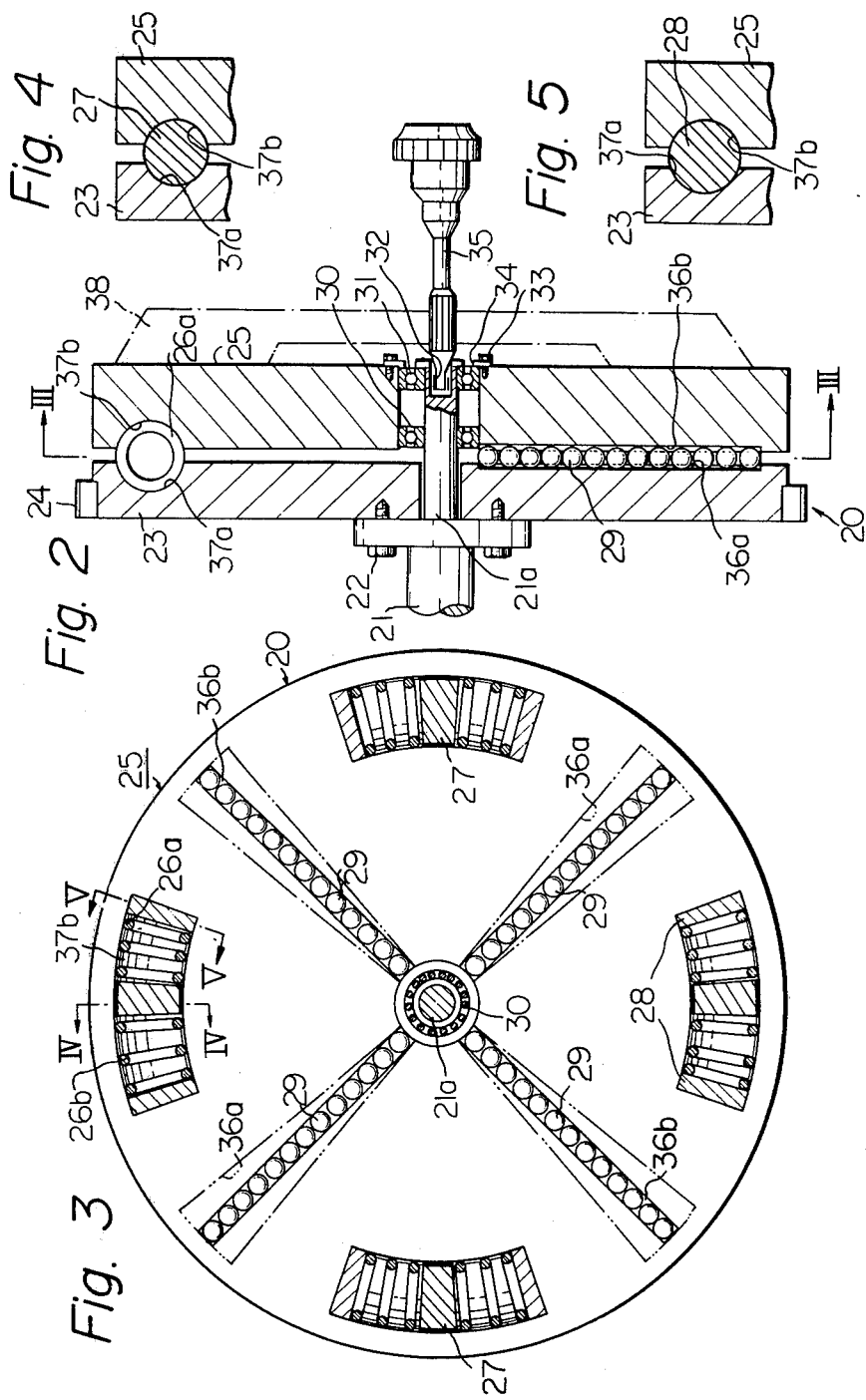

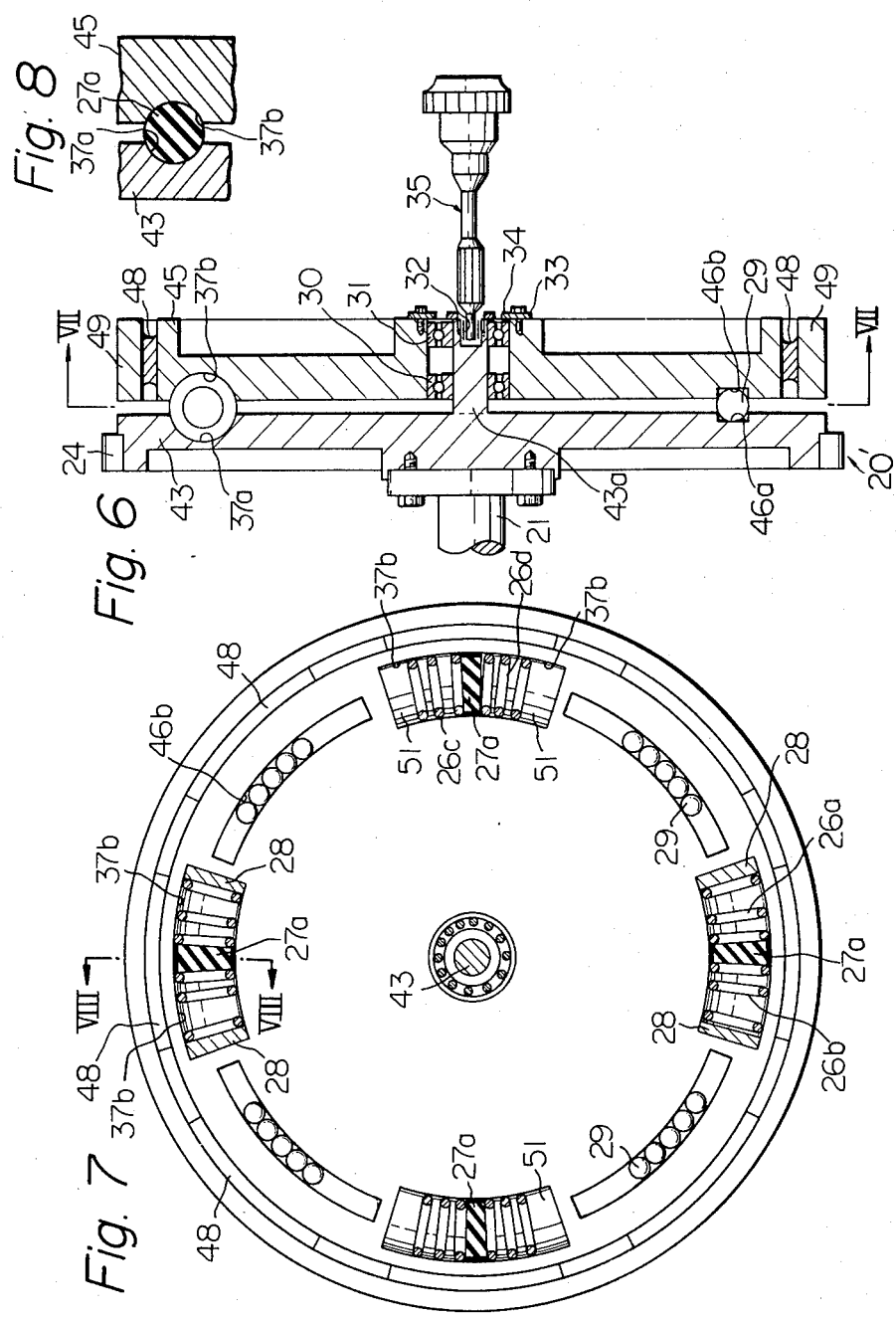

APPARATUS FOR ABSORBING TORQUE FLUCTUATIONS PRODUCED BY AN INTERNAL COMBUSTION ENGINE

CROSS-REFERENCE TO RELATED APPLICATION

This is a continuation-in-part of copending U.S. patent application Ser. No. 416,370 filed Nov. 16, 1973, and now abandoned.

FIELD OF THE INVENTION

The present invention relates to an apparatus for absorbing torque fluctuations produced by an internal combustion engine and more particularly to an apparatus for reducing vibration in a vehicle by absorbing the fluctuating torque present in the output torque produced by an internal combustion engine of the vehicle and transmitting an averaged torque to a drive train of the vehicle.

DESCRIPTION OF THE PRIOR ART

In vehicles having therein internal combustion engines, particularly what are known as reciprocating engines or Wankel rotary piston engines, problems of various vibrations and noises resulting from these vibrations arise, due to the fluctuating torque present in the output torque of the engine.

More specifically, these problems are as follows.

1. Low speed hum arising in an internal combustion engine during acceleration from the low speed range of the engine and chatter in the vehicle body.
2. Extraordinary medium speed hum arising in an internal combustion engine on the medium speed range.
3. So-called "clashing" sounds produced in connection with backlash of the gears in the transmission gear-box.
4. So-called "clatter" produced in the transmission gear-box during idling of the engine.
5. General noises produced in a vehicle in all running conditions of the engine due to the fluctuating torque produced by the engine.
6. Various problems of excessive vibrations and noise produced by the large fluctuating torque of Diesel engines in particular.

In view of these problems of vibration and noise, many investigations have previously been made and various preventive measures taken. The main preventive measures taken have been:

i. to reduce the amount of the speed fluctuation to the smallest possible, by increasing the moment of inertia of the flywheel which is provided;

ii. to increase the number of engine cylinders while limiting the volume for each cylinder and balancing the operation of the engine by selecting an optimum disposition of the cranks;

iii. to damp the fluctuating torque of an engine by providing a fluid coupling after the engine;

iv. to reduce the occurrence of irregular combustion in the engine;

v. to improve the engine balance by additionally attaching a balancing weight;

vi. to obtain a damping effect on the fluctuating torque by reduction of the torsional rigidity of the drive train, and;

vii. to damp the vibration by improving the torsional spring characteristics of the clutch disc in the clutch mechanism.

However, the above preventive measures have the following accompanying drawbacks. The increase in the moment of inertia of the flywheel of (i) brings about an increase in the total weight of the motor mechanism including an engine and accordingly a deterioration in the acceleration characteristics of the engine. The increase of the number of engine cylinders of (ii) brings about an increase in the complexity of the construction of the engine and in the production cost of the engine. The fluid coupling of (iii) produces a torque loss of the output torque of the engine whereby a deterioration in the fuel consumption (kilometer/liter), and an increase in the risk of breakdown of the fluid coupling and in the production cost of the vehicle are brought about. There are technical limitations in the reduction of vibration by improving the combustion as in (iv). Improving the engine balance as in (v) has little effect except in the case of a multicylinder engine. There are of course limitations, from the point of view of desirable strength of the axle, on lowering the torsional rigidity of the drive train as in (vi). Further, there are also limitations in the damping of vibration by the spring merely by improving the torsional spring characteristics of the clutch disc as in (vii).

Thus the production of a fluctuating torque was hitherto considered to be a congenital characteristic of vehicle engines but no fundamental measures had been found for eliminating vibration due to the fluctuating torque produced by an internal combustion engine.

SUMMARY OF THE INVENTION

Therefore, the object of the present invention is to provide an apparatus which exhibits the effect of preventing the vibration peculiar to an internal combustion engine used for a vehicle in a radical way while enabling the practical design of the engine and drive train etc., of the vehicle to be optimum to the physical or mechanical characteristics of the vehicle.

Now at certain angular velocities of rotation, for example, in the range of angular velocities of rotation below the angular velocity when idling, adequate output is not obtained from the engine and therefore, the said certain angular velocities are not provided for practical use. The applicant therefore considered that absorbing the fluctuating torque to transmit an averaged torque to the drive train would not be necessary below said certain angular velocity (hereinafter, referred to as the lower limiting value of the practical angular velocity of rotation of the internal combustion engine), Consequently, according to one aspect of the present invention, there is provided an apparatus capable of being disposed between an internal combustion engine and a drive train, and adapted for use in absorption of a fluctuating torque present in an output torque produced by the engine, comprising:

a plurality of rotationally inert bodies arranged on a common axis of rotation facing each other with a small gap therebetween, an outermost one of said bodies being connectable to a crank-shaft of said engine and the outermost one of said bodies being connectable to said drive train;

spring elements provided between the facing bodies and displaceable circumferentially with respect to the axis of rotation, each of the elements having one end thereof connected to one of said facing bodies and the end thereof connected to another of said facing bodies, and damping elements provided between said facing bodies, each of the damping elements having engagement with the two adjacent bodies of said facing bodies.

According to another aspect of the present invention, there is provided a vehicle mounting an internal combustion engine thereon and being provided with the above defined apparatus for use in absorption of a fluctuating torque present in an output torque produced by the engine.

According to a further aspect of the present invention, there is provided an apparatus for damping vibration in a vehicle, by averaging an oscillatory output torque of an internal combustion engine mounted on the vehicle, comprising a damped vibration system means comprising a plurality of rotational inertia bodies having a preselected rotational moment of inertia and spring elements and damping elements both provided between said rotationally inert bodies, the said damped vibrating system means having a resonant angular frequency preselected to be a certain value below the angular frequency of ignition of the said internal combustion engine at its lower limiting value of the practical angular velocity of rotation of the internal combustion engine and said damped vibration system means being engageable with a drive rain of the vehicle for driving the vehicle by the averaged output torque.

The present invention will become more apparent from the following description taken in connection with the accompanying drawings which illustrate a prior art apparatus, and, by way of examples, embodiments of the apparatus of the invention.

In the drawings:

FIG. 1 is a diagrammatic view of a known power train construction of a vehicle having a multi-cylinder engine and a drive train;

FIG. 2 is a cross-sectional view of an embodiment of an apparatus according to the present invention adapted for use in absorption of a fluctuating torque present in the output torque produced by an internal combustion engine; FIG. 3 is a cross-sectional view taken along the line III—III of FIG. 2;

FIG. 4 is a cross-sectional view taken along the line IV—IV of FIG. 3;

FIG. 5 is a cross-sectional view taken along the line V—V of FIG. 3;

FIG. 6 is a cross-sectional view of another embodiment of an apparatus according to the present invention adapted for use in absorption of the fluctuating torque present in the output torque produced by an internal combustion engine;

FIG. 7 is a cross-sectional view taken along the line VII—VII of FIG. 6;

FIG. 8 is a cross-sectional view taken along the line VIII—VIII of FIG. 7;

FIG. 9 is a diagrammatic view showing an equivalent vibrating system for the known construction of FIG. 1;

FIG. 10 is a diagrammatic view showing an equivalent vibrating system for apparatus according to the present invention;

Figure 11:
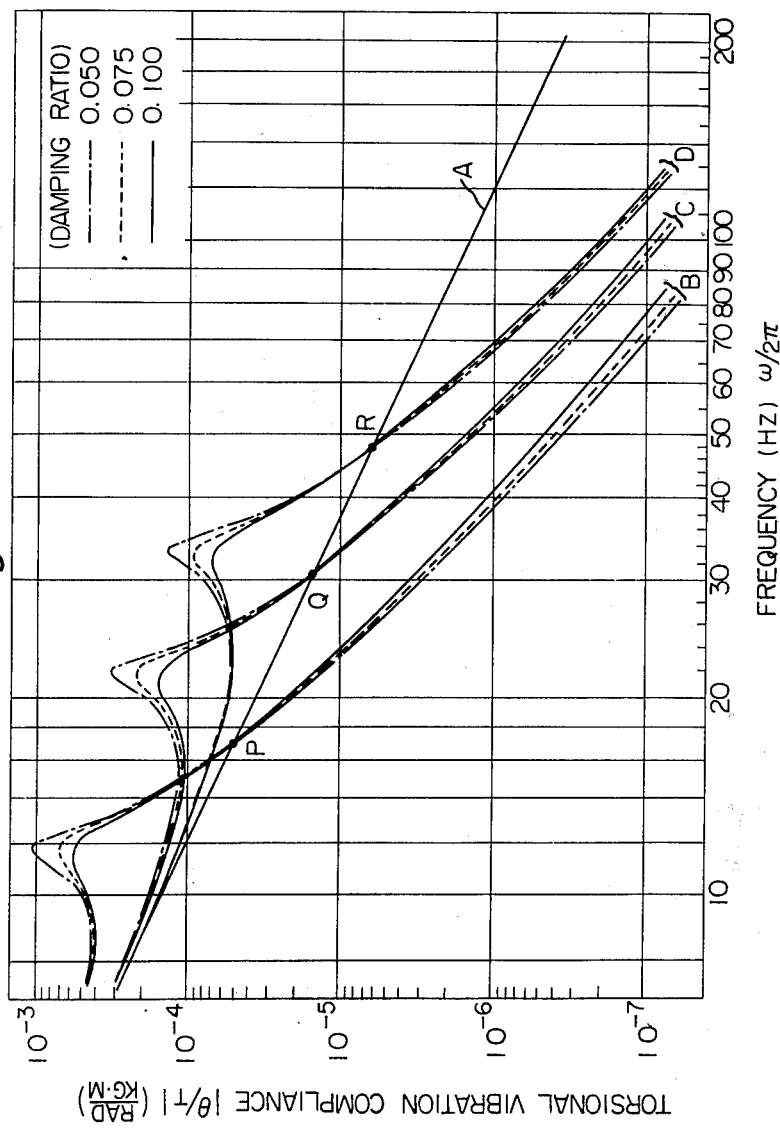
FIG. 11 is a graph showing comparative frequency response functions of the torsional vibration compliance for the equivalent vibrating systems of the known construction and the present invention.

As is shown in FIG. 1, the main moving parts in the drive train of a vehicle having a conventional multi-cylinder internal combustion engine, are pistons 11 of the multi-cylinders, crank-shaft 13, a flywheel 15 directly connected to the crank-shaft 13, a clutch mechanism 17 of the flywheel 15, and a drive shaft system 19 containing a transmission connected to the clutch mechanism 17 and a universal coupling. The flywheel 15 is provided with a ring gear 15a for starting the engine.

Referring now to FIGS. 2 and 3 which show an embodiment of the apparatus 20 according to the present invention, a crank-shaft 21 extending from an internal combustion engine (not shown) is provided with an extension forming a shaft 21a of the apparatus. The shaft 21a extends through a rotationally inert body 23 which is of disc shape and secured to a flange part on the end of the crank-shaft 21 by means of screw bolt 22. The inert body 23 is provided with a ring gear 24 for starting the engine. Another disc shaped rotationally inert body 25 is rotatably mounted on and supported at the extremity of the shaft 21a by means of bearings 30 and 31. The inert bodies 23 and 25 are coaxially arranged, and face each other with a gap therebetween. In this embodiment, the body 25 frictionally engages a clutch disc 38 on the input axle 35 of the transmission so as to enable direct transmission of power from the engine to the drive train. Grooves 36a and 36b are formed on both inside opposing surfaces of the two inert bodies 23 and 25. The grooves 36a and 36b receive a number of ball bearing 29 of equal diameter, the ball bearings 29 being able to rotate within the grooves 36a and 36b. As mentioned above, the ball bearings 29 are chosen of equal diameter, and as a result, a constant gap is provided between the two rotationally inert bodies 23 and 25.

Each groove 36a of the inert body 23 is formed to be wider than the corresponding groove 36b of the inert body 25, so that each groove 36a has a clearance for enabling a relative rotation between two bodies 23 and 25. The preferred shape of each groove 36a is that of a fan to provide equiangular clearance for all the balls. If desired, each groove 36b of the inert body 25 may also be formed into a fan-shape similar to that of each groove 36a shown by the phantom lines in FIG. 3. The amount of the clearance of each groove 36a is determined by the magnitude of the relative rotation between the two inert bodies 23 and 25, which magnitude is selected so as to meet with the design requirement for the apparatus.

In a different embodiment modified from the embodiment of FIGS. 2 and 3, only one of the facing inert bodies 23 and 25 may have grooves 36a or 36b formed on only one of the two inside opposing surfaces of the two bodies 23 and 25, so that the above-mentioned relative rotation between the two bodies 23 and 25 is permitted. It should be understood that in the modified embodiment, the grooves 36a or 36b serve to retain the balls 29.

Referring again to FIGS. 2 and 3, grooves 37a and 37b of semi-circular cross-section are respectively formed in the circumferential direction on the peripheral part of the inside opposing surfaces of the two inert bodies 23 and 25. In the embodiment of FIGS. 2 and 3, respective grooves 37a and 37b are equiangularly formed in four places on the inside surfaces of — respective inert bodies 23 and 25.

In the grooves 37a, 37b, there are provided helical springs 26a and 26b. One end of respective springs 26a and 26b engages a spring seat 27 provided in one piece with the rotationally inert body 23. That is to say, spring seat 27 is provided between the springs 26a and 26b. Other seats 28, which are provided in one piece with the rotationally inert body 25, bear the other respective ends of helical springs 26a and 26b. In the case when the above-mentioned spring seats 27 and 28 are provided in one piece with respective rotationally inert bodies 23, 25, the method, as shown in FIGS. 4 and 5, of fixing separately formed spring seats 27, 28 to the bodies 23 and 25 may be preferable from the point of view of manufacturing. However, the spring seats may be integrally formed with the rotationally inert bodies 23 and 25. As shown in FIG. 2, in a bore formed at the extremity of shaft 21a there is provided a pilot bearing 32 which supports the front extremity of the input axle 35 of the transmission. The rotationally inert body 25 is rotatably mounted by means of bearings 30, 31 as mentioned before, and the outer race of the bearing 31 is press-fixed to the body 25 by means of a holding member 34 provided with bolts 33.

FIGS. 6 and 7 show another embodiment of the apparatus 20' of the present invention, in which elements similar to the embodiment in FIGS. 2 and 3 are indicated by the same reference numerals. In this embodiment, the crank-shaft 21 is fixed to a central abutment of a rotationally inert body 43, and another rotationally inert body 45 is rotatably mounted on a shaft 43a extending from the inert body 43, by means of bearings 30, 31. With respect to helical springs 26a, 26b provided in the upper and lower grooves 37a, 37b in FIG. 7, it will be seen from FIG. 7 that respective ends of each spring 26a or 26b engage spring seats 27a and 28. Helical springs 26c, 26d in the left and right grooves in FIG. 7 engage, by means of one respective end, the spring seat 27a on one side, but the other end of respective springs 26c, 26d is separated from the end walls of grooves 37a, 37b by a gap 51 in the grooves 37a and 37b. However, when the gap 51 is closed by rotation of the bodies 43, 45, springs 26c, 26d start to produce a spring action between the spring seats 27a, and the end walls of grooves 37a, 37b. Thus, springs 26c, 26d in the left and right grooves 37a, 37b cooperate with springs 26a, 26b received in the upper and lower grooves 37a, 37b in FIG. 7 to produce a progressive spring characteristic described later. As shown in FIG. 8, spring seats 27a may be made of resilient material.

In this embodiment, ball bearings 29 are rotatably held in grooves 46a, 46b provided at the peripheries of the inside opposing surfaces of both rotationally inert bodies 43, 45. At least one of either the grooves 46a of the inert body 43 or the grooves 46b of the inert body 45 should be provided with an arcuately extended length which is longer than that necessary for receiving the full number of ball bearings 29, so that said arcuately extended length of the groove 46a provides a clearance for enabling a relative rotation between said two bodies 43 and 45. In the present embodiment, it is clearly shown in FIG. 7 that the inert body 45 is provided with arcuately extended grooves 46b. The number of ball bearings 29 and the clearance length of the extended grooves 46b are determined so as to meet with the design requirement for the apparatus 20'.

Further, in this embodiment another rotationally inert body 49 is arranged on the outer periphery of rotationally inert body 45. The inert bodies 45 and 49 are connected by means of resilient elements 48 provided therebetween.

In a different embodiment modified from the embodiment of FIGS. 6 and 3, only one of the facing inert bodies 43 and 45 may have grooves 46a or 46b formed on only one of the two inside surface of the two bodies 43 and 45 so that the ball bearings are retained in the grooves 46a or 46b. The elimination of either grooves 46a or 46b enables the two inert bodies to carry out the relative rotation between them.

The operations and effects of the apparatus 20 and 20' will now be explained in comparison with the known construction provided with a simple flywheel 15, as shown in FIG. 1.

Referring again to FIGS. 2 and 3, when the engine is in operation, an output torque containing a fluctuating torque in addition to a constant output torque, is exerted on the crank-shaft 21. This fluctuating torque in turn produces a fluctuation in rotational angular velocity of which the fundamental angular frequency component is the angular frequency of the number of ignitions in the engine per unit time. By the term "angular frequency of ignition" is meant the ignition frequency multiplied by $2\pi$. This fluctuation of angular velocity appears at the rotationally inert body 23 and is transmitted to the other rotationally inert body 25 by circumferential displacement of helical springs 26a, 26b. The damped vibration system constituted by rotationally inert bodies 23, 25 helical springs 26a, 26b and rotationally moving ball bearings 29, as is already well-known from the theory of vibration, has an angular frequency of resonance $\omega n$ determined by the moment of inertia of the inert body 25, the spring constants of helical springs 26a, 26b, and the value of the viscous damping coefficient resulting from the frictional resistance, in this case mainly provided by the viscous frictional resistances of the ball bearings 29 when relative rotation occurs between the two inert bodies 23 and 25.

That is, although the natural angular frequency $\omega o$ is determined by the moment of inertia of the rotationally inert body 25 and the spring constants of the helical springs 26a, 26b, the actual angular resonance frequency $\omega n$ of the damped vibration system is somewhat different from $\omega o$ due to the viscous damping produced by the viscous frictional resistances of the ball bearings. In the damped vibration system having the angular resonance frequency $\omega n$, when an applied vibrational torque of unit magnitude acts on the crank-shaft 21 in the operational range of the internal combustion engine wherein the angular ignition frequency of the engine is lower than $\sqrt{2}\omega n$, the magnitude of the amplitude of the rotational vibrations produced in the rotationally inert body 25, i.e. the torsional vibration — compliance, is larger than the torsional vibration compliance of known construction provided with only a simple flywheel 15 in the case where a forced vibrational torque acts on said known construction. However, in the operational range of the internal combustion engine wherein the angular ignition frequency of the engine is higher than $\sqrt{2}\omega n$, the torsional vibration compliance of the damped vibration system is smaller than the compliance in the case of the known construction, and the difference between these two compliances increases with increase in the angular frequency. Consequently, if the value of the above-mentioned $\sqrt{2}\omega n$, is preselected to be a value below the angular frequency of ignition of the internal combustion engine when operating at an angular velocity corresponding to the lower limiting value of practical angular velocity of rotation, by suitable choice and design of the moment of inertia of the rotationally inert body 23, 25, the spring constants of the coil springs 26a, 26b, and the frictional viscous damping coefficient of the ball bearings 29, the apparatus 20 or 20' will exhibit an absorbing effect in respect of the fluctuating torque in the whole practical operational range of angular velocities of rotation of the internal combustion engine. Of course, the average torque of the internal combustion engine is stored in the rotationally inert bodies 23, 25 in the form of the rotational energies of both bodies 23, 25.

In designing the frictional damping coefficient of the ball bearing 29, such factors as the number of ball bearings 29, their size, the manner of their arrangement, and the pressure exerted on the ball bearings 29 in the axial direction by the rotationally inert bodies 23, 25 may be varied.

FIGS. 9 and 10 show equivalent vibrational systems for the known construction shown in FIG. 1 and the apparatus 20 of FIGS. 2 and 3. The analysis of the fundamental operation of the apparatus 20 will be carried out hereinafter with reference to the above two equivalent systems.

If, in the equivalent vibrational system of FIG. 9 having a flywheel 15, the moment of inertia of the drive train mechanism is $J_o$, the fluctuating torque operating on the flywheel is $T(\omega)$, and the amplitude of the angular vibrations of the flywheel 15 is $\theta_1(\omega)$, the following relationship holds.

$$\theta_1/T(\omega) = -1/J_o\omega^2 \qquad (1)$$

In the equation (1), $\omega$ is, of course, not the previously mentioned angular velocity of rotation of the internal combustion engine, but the angular frequency of the fluctuating torque acting on the flywheel 15.

If now in the equivalent vibrational system of FIG. 10 relating to the present invention, the fluctuating torque applied to the crank-shaft 21 is $T(\omega)$, the moments of inertia of the rotationally inert bodies 23, 25 are $J_1$ and $J_2$, the combined spring constant of the helical springs 26a, 26b is K, the damping coefficient of the total ball bearings 29 is c, and the amplitude of the angular vibrations of the rotationally inert body 25 is $\theta_2(\omega)$, the following equation holds.

$$\theta_2/T(\omega) = (K + jc\omega)/\{(K - J_2\omega^2 + jc\omega)(K - J_1\omega^2 + jc\omega) - (K + jc\omega)^2\} \qquad (2)$$

The respective moments of inertia of the rotationally inert bodies 23 and 25 can be chosen so that the following equation is satisfied with respect to the equivalent vibrational system of FIG. 9.

$$J_1 + J_2 = J_o \qquad (3)$$

The above two equations (1) and (2) represent the frequency response functions of the torsional vibration compliance, respectively.

FIG. 11 is a graph showing the torsional vibration compliances as functions of the angular frequency $\omega$ ($\omega$ is $2\pi$ times the frequency). That is, the frequency = $\omega/2\pi$) of the fluctuating torque for the above two equations (1) and (2).

In FIG. 11, straight line A represents the torsional vibration compliance in the equivalent vibrational system of the known construction according to the equation (1), while the three groups of curved lines B, C and D represent the torsional vibration compliances of the equation (2) for three values of the natural angular frequency $\omega n$. The three curved lines in each group represent variation in the compliance with change in the damping ratio from 0.050 to 0.100.

In this case, $J_1 + J_2 = J_o$. From FIG. 11, it will be understood that in the known construction from the internal combustion engine to the drive train system, when the fluctuating torque produced by the engine during its operation is absorbed by the flywheel 15, the absorption characteristic obtained from the straight line A is $-12dB/oct$ (i.e. if the frequency is doubled, the magnitude of the torsional compliance is reduced to ¼).

In contrast, when the apparatus 20 is provided between the engine and the drive train, it will be understood that the absorption characteristic essentially becomes $-24$ dB/oct (i.e. if the frequency is doubled, the magnitude of the torsional compliance is reduced to 1/16). Now, the curves B intersect the straight line A at the point P, the curves C intersect the straight A at the point Q, and the curves D intersect the straight line A at the point R. As a result, in the frequency range higher than respective intersecting points P, Q and R, the magnitudes of the torsional vibration compliances are reduced to about ¼ in comparison with the known construction by provision of the apparatus 20 according to the present invention for a doubling of the frequency of the fluctuating torque. It will therefore be appreciated that the fluctuating torque produced by the internal combustion engine is very effectively absorbed. Thus, although the apparatus 20 according to the present invention might have no more than the same moment of inertia as the known construction, if equation (3) is satisfied (and consequently, the weights can also be the same) the absorption of the fluctuating torque is much improved compared with the known construction of FIG. 1.

Referring again to the embodiment of FIGS. 6 and 7, helical springs 26c and 26d are further provided to impart a progressive characteristic (non-linear characteristic) to the spring characteristic of the apparatus 20. In other words, the combined spring constant is low for oscillations within a certain amplitude range, but if the amplitude of the oscillations exceeds this range, the gap 51 is closed and the combined constant becomes larger because the springs 26c, 26d are brought into play. As a result, the value of the angular resonance frequency $\omega n$ can be preselected to a sufficiently small value, while yet providing sufficient rigidity of the apparatus 20' in cases where an unusually large torque acts on the drive train (e.g. if the clutch is suddenly engaged by mistake).

Furthermore, in the apparatus 20', resilient elements 48 and a further rotationally inert body 49 are provided at the periphery of the body 45 in order to form a sort of dynamic torsional vibration absorber. This dynamic torsional vibration absorber absorbs angular vibration in the neighbourhood of the resonant angular frequency $\Omega d$ of the said dynamic absorption system. This resonant angular frequency is given by the following equation:

$$\Omega d = \sqrt{Kd/Jd} \qquad (4)$$

where $Kd$ is the torsional spring constant of the resilient element 48 and $Jd$ is the moment of inertia of the rotationally inert body 49.

Thus, by predesigning the spring constant $Kd$ of the resilient elements 48 and the moment of inertia $Jd$ of the rotationally inert body 49 it can be arranged to satisfy the following equation for obtaining a natural frequency in which absorption effect is obtained:

$$\omega n/\Omega d = 1/1 + (Jd/J_2) \qquad (5)$$

When $Kd$ is determined so as to satisfy this equation (5), the vibration of the rotationally inert body 45 at the angular frequency $\omega n$ can be effectively damped. Thus, it is possible to prevent the torsional compliance of the apparatus 20' from becoming excessively large in a certain range of the angular frequency (i.e. the peaks of the curves B, C and D in FIG. 11 can be reduced). In addition, in another specific range of the angular frequency, that is, in the range of a specific angular velocity of rotation of the internal combustion engine, it is possible to arrange that the value of the torsional vibration compliance of the apparatus 20' is made particularly small. In this way, the torsional vibration compliance and therefore, the vibration transmitted to the vehicle can be minimized in an angular frequency range of the fluctuating torque corresponding for example, to high speed rotation of the internal combustion engine, such as is employed in high speed driving. This ensures safety at high speeds.

The present invention has been explained above with reference to two typical embodiments. However, the invention is not limited to these embodiments. For example, the pair of rotationally inert bodies shown in the embodiments may be replaced by a plurality of rotationally inert bodies axially and successively arranged.

What is claimed is:

1. An apparatus capable of being disposed between an internal combustion engine and a drive train mechanism, and adapted for use as a damped vibration system in absorption of a fluctuating torque present in an output torque produced by the engine, comprising:
a plurality of rotationally inert bodies arranged on a common axis of rotation facing each other with a small gap therebetween, an outermost one of said inert bodies being connectable to a crank-shaft of said engine and the other outermost one of said inert bodies being connectable to said drive train mechanism,
spring elements provided between the facing inert bodies and displaceable circumferentially with respect to the axis of rotation, each of the elements having one end thereof connected to one of said facing inert bodies and the other end thereof connected to another of said facing inert bodies, and
damping elements provided between said facing inert bodies, each of the damping elements having engagement with two adjacent bodies of said facing inert bodies, the values of the moment of inertia, spring constant, and damping coefficient of the system being preselected for averaging the torque output of the engine.

2. An apparatus as claimed in claim 1, wherein each of said rotationally inert bodies comprises a round disc member having a plurality of circumferentially extending grooves formed in its surface facing an adjacent disc member, said grooves being provided for receiving said spring elements.

3. An apparatus as claimed in claim 1, wherein each of said rotationally inert bodies comprises a round disc member, and further wherein said damping elements comprise a multiplicity of ball bearings having equal diameters and rotatably supported in grooves formed in at least one of said facing disc members.

4. An apparatus as claimed in claim 3, wherein each of said spring elements comprises a helical spring received in circumferentially extending grooves formed in the opposing surfaces of the facing disc members.

5. An apparatus as claimed in claim 1, further comprising second spring elements in addition to said circumferentially displaceable first spring elements, said second spring elements being supported between said facing bodies and capable of displacing in a circumferential direction with respect to said common axis of rotation, each of said second spring elements having one end thereof connected to one of said facing bodies and the other end apart from but engageable with another of said facing bodies whereby said first and second spring elements provide for said apparatus a combined spring characteristic exhibiting a relatively low spring constant until said other end of said second spring elements engages with said another of said facing bodies, but a larger spring constant after engagement of said second spring elements with said another of said facing bodies.

6. An apparatus as claimed in claim 5, wherein said one of said facing bodies and said another of said facing bodies are provided with at least a pair of opposing grooves formed in opposing faces thereof and having the same length, and a seat member secured to the intermediate part of one of said grooves and projecting into the other of said grooves thereby a pair of said second spring elements is received in said opposing grooves, each said one end of said second spring elements being connected to the seat member and each said other end thereof being spaced from the respective end wall of said respective groove by a predetermined distance.

7. An apparatus as claimed in claim 1, wherein at least one of said rotationally inert bodies is provided with a dynamic torsional vibration absorber means.

8. An apparatus as claimed in claim 7, wherein said dynamic torsional vibration absorber means comprise an outer inert body radially spaced from the periphery of said rotationally inert body, and resilient means connecting said outer inert body and said rotationally inert body.

9. A vehicle provided with a fluctuating torque absorbing apparatus as claimed in claim 1.

10. A vehicle as claimed in claim 9, wherein said fluctuating torque absorbing apparatus has a resonant angular frequency predetermined to be a certain value below the angular frequency of ignition of said internal combustion engine when said engine is operated at its lowest practical number of revolutions per unit time.

11. An apparatus as claimed in claim 1 wherein the rotational moment of inertia of the inert bodies, the spring constant of the spring elements, and the damping coefficient of the damping elements being predetermined to create a damped vibration system having a resonant angular frequency equal to or less than $1/\sqrt{2}$ times the angular frequency of ignition of said internal combustion engine when said engine is operated at its lowest practical number of revolutions per unit time.

12. An apparatus as claimed in claim 1, wherein said damped vibration system means comprises: a plurality of disc members arranged for coaxial rotation, one of the disc members being adjacent to the crank-shaft and provided with means for connection to said crank-shaft and another of said disc members being adjacent to the drive train and provided with means for engagement to said drive train; resilient means linking adjacent disc members for permitting relative angular movement of said adjacent disc members about the axis of coaxial rotation, and damping means provided between said adjacent disc members for damping said relative angular movement of said adjacent disc members.

13. An apparatus as claimed in claim 12, wherein said connecting means of the one of said disc members adjacent to said crank-shaft comprise screw bolts providing screw connection between a flange formed on said crank-shaft and the said one of said disc members and wherein said engaging means of the another of said disc members to said drive train comprise an axially outside surface of said disc member frictionally engageable with a clutch disc of said drive system.

14. An apparatus as claimed in claim 12, wherein said resilient means comprise helical springs arranged to be circumferentially displaceable with respect to the axis of said coaxial rotation of said disc members and wherein said damping means comprise a number of steel balls having equal diameters and rotatably supported in grooves formed in the opposing surfaces of said disc members.

* * * * *